United States Patent [19]
Endo et al.

[11] Patent Number: 5,439,233
[45] Date of Patent: Aug. 8, 1995

[54] LARGE ANNULAR SEGMENTED SEAL WITH LOCK PORTIONS FOR MISSILE LAUNCH TUBE

[75] Inventors: Jerry K. Endo; Jeffrey P. Connell, both of Santa Clara; Philip G. Ruhle, Los Gatos, all of Calif.

[73] Assignee: Westinghouse Electric Corporation, Pittsburgh, Pa.

[21] Appl. No.: 530,912

[22] Filed: Sep. 9, 1983

[51] Int. Cl.[6] .......................................... F16J 15/32
[52] U.S. Cl. .............................. 277/212 F; 277/152; 89/1.8
[58] Field of Search ................ 277/152, 174, 212 F, 277/212 C

[56] References Cited

U.S. PATENT DOCUMENTS

| | | | |
|---|---|---|---|
| 2,743,950 | 5/1956 | Helfreght | 277/179 |
| 2,872,219 | 2/1959 | Cobb | 277/179 |
| 4,396,201 | 8/1983 | Rudd et al. | 277/212 F |
| 4,399,999 | 8/1983 | Wold | 277/212 F |

*Primary Examiner*—Stephen C. Bentley
*Assistant Examiner*—Christopher K. Montgomery

[57] ABSTRACT

A hoop seal for a large annular opening having a high strength ring disposed in the hoop, the hoop having a sealing lip extending at an angle into the high pressure side of the seal, a base and a membrane connecting the hoop to the base which allows the hoop to rise on the side where the annular opening narrows and thereby provide a lateral force which acts to equalize the annular opening.

6 Claims, 2 Drawing Sheets

SEGMENTED SEAL WITH LOCK PORTIONS FOR MISSILE LAUNCH TUBE

GOVERNMENT CONTRACT

The United States Government has rights in this invention pursuant to Contract No. N00030-81-C-0105 between Westinghouse Electric Corporation and the Department of Defense.

BACKGROUND OF THE INVENTION

This invention relates to seals and more particularly to large annular seals such as those utilized in missile launchers.

Elastomer seals such as described in U.S. Pat. No. 4,033,593 and a patent application filed in December of 1982, Ser. No. 06/451,585, entitled "LARGE SEGMENTED SEAL WITH LOCK PORTIONS" now U.S. Pat. No. 4,433,848, have been utilized in launch tubes as seals.

SUMMARY OF THE INVENTION

In general, a seal for a large annular opening disposed between two cylindrical members, when made in accordance with this invention, comprises a base ring portion attached to one of the cylindrical surfaces, a hoop portion having a lip portion extending from one side thereof and a membrane extending between the loop portion and the base portion.

BRIEF DESCRIPTION OF THE DRAWINGS

The objects and advantages of this invention will become more apparent from reading the following detail description in conjunction with the accompanying drawings, in which.

DESCRIPTION OF THE PREFERRED EMBODIMENT

Figure 1:
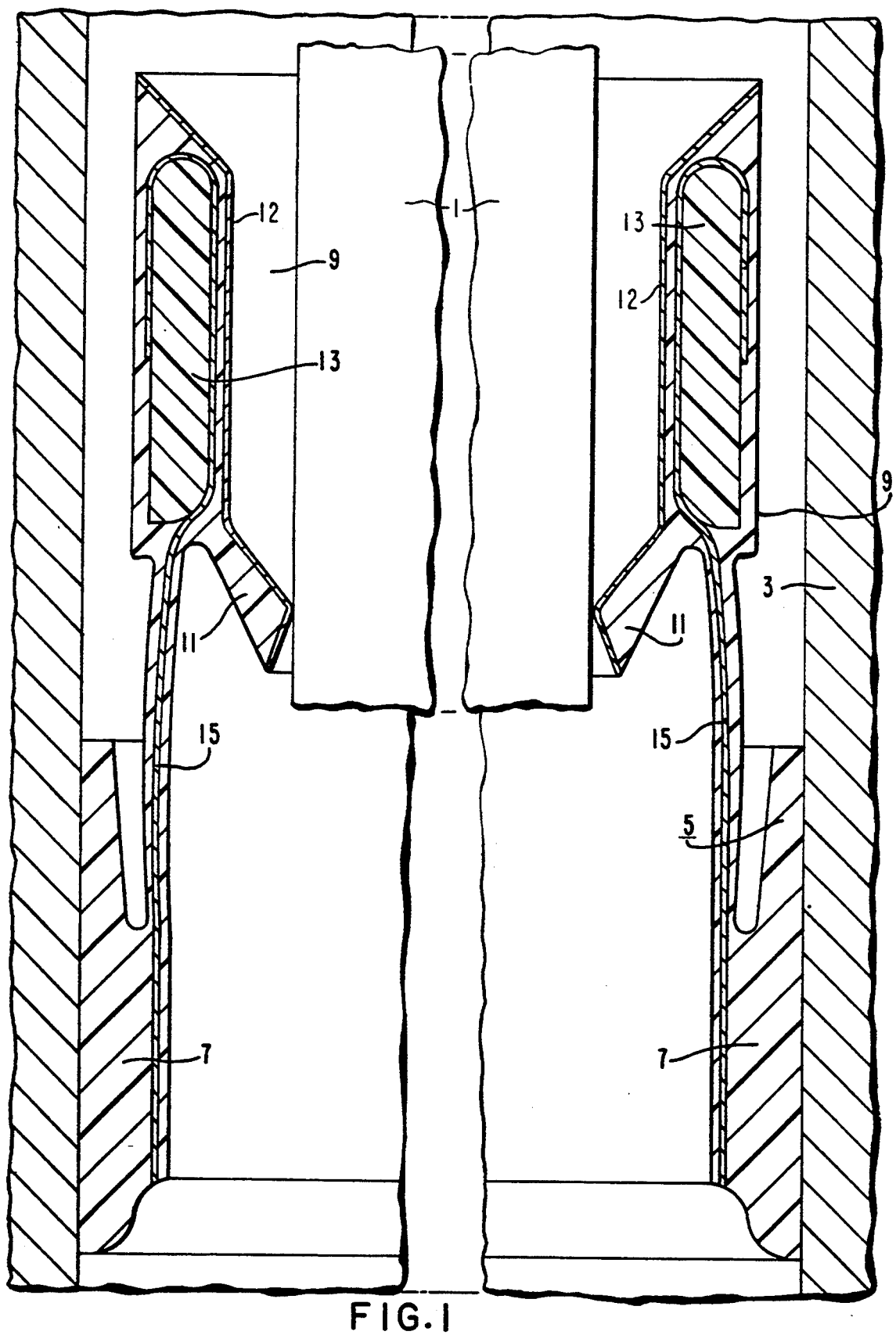
FIG. 1 is a partial sectional view of a launch tube and missile showing a seal made in accordance with this invention.
Figure 2:
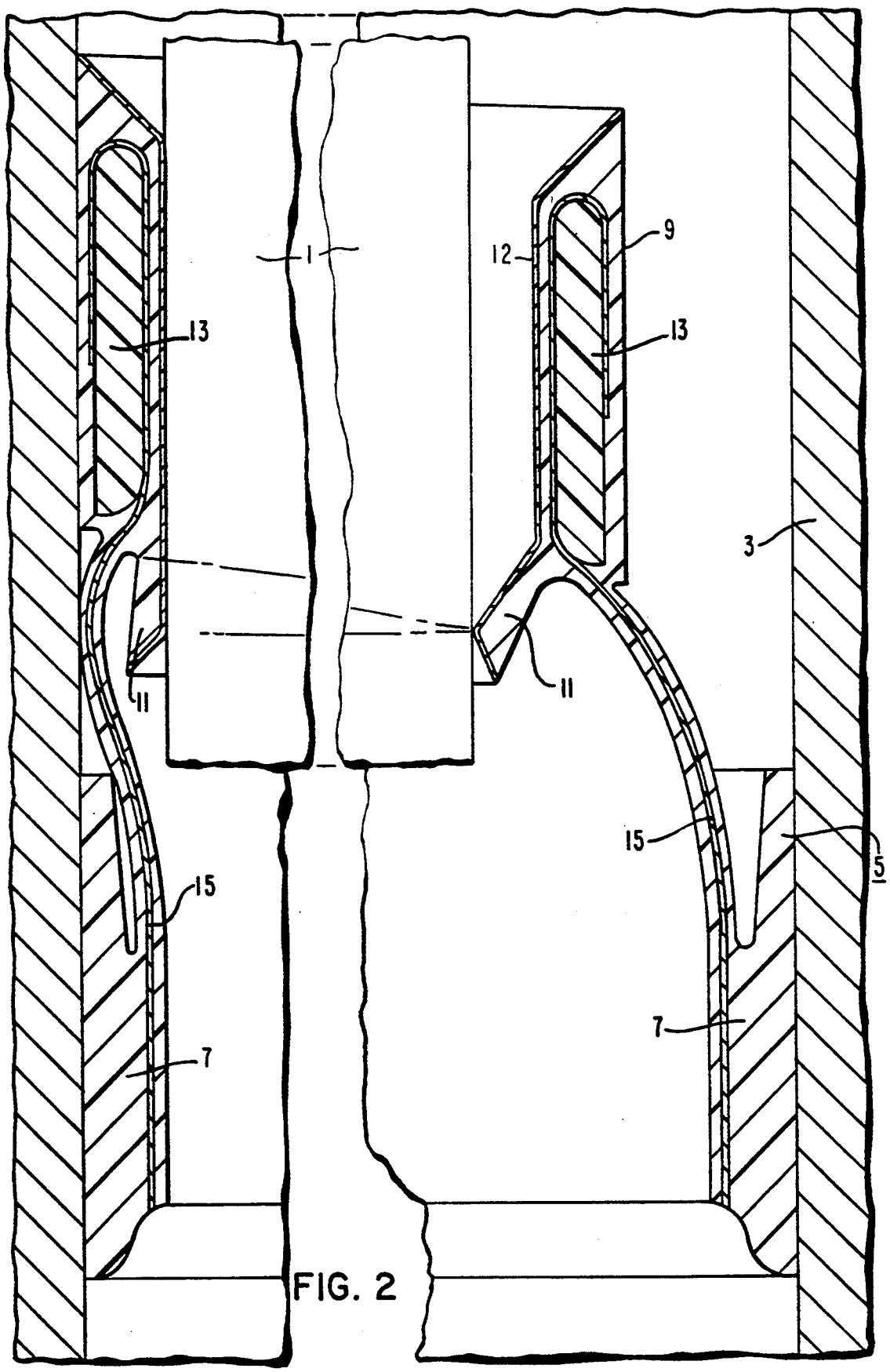
FIG. 2 is a partial sectional view similar to FIG. 1 with the missile offset in the launch tube.

Referring now to the drawings in detail, and in particular to FIGS. 1 and 2, there is shown a portion of a missile 1 disposed in a launch tube 3 and a seal 5 for a large annular opening between the missile 1 and the launch tube 3.

The seal 5 comprises a base ring portion 7 attached to the launch tube 3 and a hoop portion 9 having a lip portion 11 which extends radially inwardly and downwardly so that the lip portion 11 is inclined toward the high pressure side of the seal 5. The loop portion 9 has a Teflon ® lining 12 disposed on the surface which contacts the missile 1. The upper end of hoop portion 9 tapers outwardly forming a generally conical portion at the upper end of the seal 5. The hoop portion 9 also has a high strength ring 13 made of graphite-epoxy composite material disposed therein. Extending between the base portion 7 and the hoop portion 9 is a membrane 15 which loops over the high strength ring 13. The membrane portion 15 is preferably formed of an aromatic polyamide such as Kevlar ®. The membrane 15 is encapsulated in polyurethane. The base portion, the membrane portion and the hoop portion are made integral with each other, being cast in polyurethane to form a large annular seal.

FIG. 2 shows the self-centering characteristic of the seal. It should be noted that when the missile 1 is eccentrically disposed in the launch tube 3, the seal hoop 5 moves upwardly on the missile 1 on the side where the missile 1 is closest to the launch tube 3 so that the launching pressure exerts a lateral pressure on the missile tending to move the missile 1 toward the center of the launch tube 3. An induced tension in the membrane 15, being a function of a toriodal radius, is greater on the wide gap side of the seal 5 also transmits a recentering force on the missile 1.

The hoop seal 5 hereinbefore described advantageously provides a high pressure seal which produces a minimum amount of friction between the missile 1 and the seal 5 and provides lateral forces to center the missile 1 during the launch.

What is claimed is:

1. A self-centering seal for forming a high pressure seal in a large annular opening disposed between inner and outer cylindrical members, said seal being made of an elastomer and comprising a base ring portion attached to one of said cylindrical members; a hoop portion having a lip portion disposed thereon to form a seal on the other of said cylindrical members; and a tensile membrane extending between said hoop portion and said base portion, whereby the pressure being sealed acts on said tensile membrane exerting a lateral pressure tending to center the inner cylindrical member within the outer cylindrical member.

2. A seal as set forth in claim 1, wherein the hoop portion has a high strength ring disposed therein.

3. A seal as set forth in claim 2, wherein the lip portion extends from the hoop portion and is inclined toward a high pressure side of said seal.

4. A seal as set forth in claim 1, wherein the high strength ring is a graphite-epoxy composite material.

5. A seal as set forth in claim 1, wherein the membrane is an aromatic polyamide material.

6. A seal as set forth in claim 1, wherein the membrane loops over the high strength ring.

* * * * *